United States Patent [19]

Shefer et al.

[11] Patent Number: 5,135,704
[45] Date of Patent: Aug. 4, 1992

[54] RADIATION SOURCE UTILIZING A UNIQUE ACCELERATOR AND APPARATUS FOR THE USE THEREOF

[75] Inventors: Ruth Shefer, Newton; Robert E. Klinkowstein, Winchester, both of Mass.

[73] Assignee: Science Research Laboratory, Inc., Somerville, Mass.

[21] Appl. No.: 488,300

[22] Filed: Mar. 2, 1990

[51] Int. Cl.⁵ .............................................. G21B 1/00
[52] U.S. Cl. .................................... 376/108; 376/110; 376/115
[58] Field of Search ............... 376/108, 110, 115, 137, 376/158, 159, 161, 199; 328/233, 256, 262; 250/423, 518.1

[56] References Cited

U.S. PATENT DOCUMENTS

| | | | |
|---|---|---|---|
| 3,546,512 | 12/1970 | Frentrop | 376/108 |
| 3,609,369 | 8/1971 | Croitoru | 376/108 |
| 3,629,588 | 12/1971 | Eyrich | 376/108 |
| 3,778,627 | 12/1973 | Carpenter | 250/499 |
| 3,781,639 | 12/1973 | Peschel | 321/15 |
| 3,993,910 | 11/1976 | Parkin et al. | 250/499 |
| 4,812,775 | 4/1989 | Klinkowstein et al. | 328/233 |

Primary Examiner—Brooks H. Hunt
Assistant Examiner—Meewa Chelliah
Attorney, Agent, or Firm—Wolf, Greenfield & Sacks

[57] ABSTRACT

A high energy, charged particle accelerator, and radiation sources utilizing such accelerator are provided. More particularly, a high yield neutron generator and apparatus for the use of such generator are provided. The generator utilizes an ion source, a target adapted to generate neutrons when bombarded by high energy ions and an accelerator tube between the source and target. A multistage cascade rectifier is paraxial with the accelerator tube and has a voltage gradient which substantially matches that of the accelerator tube. The cascade rectifier preferably surrounds the accelerator tube and has equipotential metal plates on each side of each stage, the potential gradients between each pair of plates being substantially uniform and being substantially equal to the voltage gradient in the adjacent section of the accelerator tube. Generator elements may be enclosed in a pressure vessel and a moderator may be provided in the vessel, near the target to thermalize neutrons emitted from the target. The neutron generator may be utilized for explosives detection, such as part of a mine detector or to detect explosives in luggage or other items being inspected as part of a security system. The neutron generator may also be utilized for drug detection and for nondestructive testing of objects formed of metals or other dense materials.

20 Claims, 3 Drawing Sheets

RADIATION SOURCE UTILIZING A UNIQUE ACCELERATOR AND APPARATUS FOR THE USE THEREOF

FIELD OF THE INVENTION

This invention relates to charged particle accelerators, radiation sources utilizing such accelerators and apparatus utilizing such radiation sources. More particularly, the invention relates to a single ended, high energy accelerator, a neutron source, preferably a high yield neutron source, utilizing such accelerator and to nondestructive testing apparatus, including drug and explosive detectors, utilizing such source.

BACKGROUND OF THE INVENTION

Various types of radiation are utilized for applications in industry, medicine, and other areas. Such radiation may include neutrons, gamma rays, and X-rays, each of these types of radiation having certain advantages and disadvantages when used for various applications. One frequently used source for such radiation is an accelerator type generator which generates the desired radiation by bombarding a suitable target with accelerated high energy charged particles. In such devices, it is frequently desired to obtain a very high radiation yield or flux. This normally requires that the charged particles impinging on the target be at high energy. To accelerate the charged particles to such high energy, to the extent that it is currently possible, generally requires large and expensive equipment. Accelerators capable of generating high energy charged particles are also required in applications other than radiation sources. A need therefore exists for an accelerator capable of producing very high energy charged particles, for example ions, protons, or electrons, which is relatively compact and inexpensive. Such device should also be reliable, having a reasonable mean time between failures.

One type of radiation which is becoming increasingly useful in commercial applications is neutrons. Most such applications, (which include explosive detection, such as mine detectors and baggage inspection devices for airports or other transportation facilities, drug detection and nondestructive testing of metals and other dense materials) require thermal neutrons with a high neutron flux. For explosive detection, advantage is taken of the fact that, when a thermal neutron flux is directed at a high explosive, such as that contained in a mine, there is a neutron capture reaction in the nitrogen component of such explosive which results in high energy 10.8 MeV gamma rays being produced. These gamma rays provide a unique signature for the nitrogen component and may be detected to indicate the presence of explosives.

While thermal neutrons are preferred for applications such or as those indicated above because they interact more strongly, and therefore provide a more easily discriminatable signature, fast neutrons may also be utilized for applications such as drug or explosives detection by detecting the unique scatter cross section of the neutrons, gamma ray emissions caused by such neutrons or both. Fast neutrons may be preferable in some such applications because of their capability of penetrating deeper and the fact that they are less easily shielded. The deeper penetration capability may, for example, make fast neutrons preferable for mine detection applications.

Current devices for detecting explosives in this way utilize a radioisotope, for example a 252 Cf radioisotope as the neutron source. However, a radioisotopic neutron source cannot be switched off when not in use. Since radiation is potentially hazardous, the inability to switch the device off has resulted in various methods being utilized for shielding the radioisotope source when the source is not in use. This need for shielding results in at least three potential problems. First, the shielding is cumbersome for use in the field, such as would normally be required for explosives detection, and adds significantly to the system size, weight and complexity. In addition, the 252 Cf source, which has a half life of 2.5 years, creates logistic burdens associated with its acquisition, storage, replacement and disposal. Finally, to reduce shielding requirements within commercially acceptable limits, and to reduce the radiation hazard, such sources currently in use generally produce a relatively low neutron yield which is barely adequate for the explosives detection application, for example neutron yields up to $2 \times 10^8$ neutrons/second. This limits the scanning velocity at which the systems utilizing such source can be operated. Such yields are not adequate for various other nondestructive testing applications which may require yield in the $10^{11}$–$10^{12}$ range.

For these reasons, a reliable electronic neutron generator, such as an accelerator neutron source, would offer significant advantages. These advantages would include on/off switchability, no persistent radioactivity (except for minute induced radioactivity in material inside the generator which should have a half life of only a few minutes) and both higher and controllable neutron flux. In particular, neutron fluxes which may range up to the $10^{12}$ neutron/second range are possible. However, existing electronic neutron sources have been large and costly and have not had adequate reliability-y for explosive or drug detection or nondestructive testing applications. For example, one available neutron generator capable of providing the required neutron flux operates at a relatively high deuteron current, approximately 4 mA, which results in limited source life due to the high power loading on the target and sputtering from the target and other surfaces within the accelerator. A higher energy device utilizing a Van de Graaff generator is capable of generating very high neutron fluxes and operates at low beam current and power, thus providing an extended operating lifetime. However, this improvement in life is achieved at the expense of greatly increased system size and cost, the size and cost of this device making it unsuitable for application as the neutron source in most explosive detection applications.

Similar problems arise with neutron sources utilized for nondestructive testing of aircraft parts or other objects fabricated of metal or other dense materials, where X-rays cannot provide sufficient penetration. Such testing is utilized to locate hidden cracks or other defects in the material. With the increasing age of both military and commercial aircraft, and recent accidents resulting from metal fatigue and related problems, the need for a relatively effective and inexpensive device for nondestructively testing aircraft parts is apparent. A similar situation exists with invisible parts, such as metal supports in bridges and other structures, where nondestructive testing is required.

In view of the above, it is apparent that a need exists for a relatively compact and inexpensive radiation source, and in particular a neutron source which produces a high yield of neutrons (i.e., in the $10^8$ to $10^{12}$ neutrons/second) range, which is reliable, can operate for a relatively long period of time (greater than 2000 hours mean time between failures), may have its radiation output level easily controlled, and may be switched on and off so as to not generate harmful radiation when not in use. A need also exists for various explosive and drug detection devices and for nondestructive testing systems employing such a neutron source.

SUMMARY OF THE INVENTION

In accordance with the above, this invention provides a single ended accelerator for producing high energy charged particles. The accelerator includes a source of the charged particles, an accelerator tube positioned to receive charged particles from the source at a first end thereof and to emit accelerated charged particles at its opposite end, a means for establishing a predetermined potential difference between the two ends of the accelerator tube, with a predetermined potential gradient in the tube between the first and second ends, and a multistage cascade rectifier which is paraxial with the accelerator tube and has a voltage gradient which substantially matches that of the accelerator tube. The accelerator may have a target positioned to be bombarded by the accelerated charged particles, the target being adapted to emit selected radiation when bombarded by the particles. The charged particle source may be a proton source, with gamma rays being emitted as the radiation from the target or the source may be an electron source with X-rays being emitted as the radiation. For preferred embodiments, the source is an ion source and the radiation is a high yield neutron flux.

More particularly, in accordance with a preferred embodiment of the invention, a high yield neutron generator or source is provided which utilizes an ion source, a target adapted to generate neutrons when bombarded by high energy ions, an accelerator tube between the source and target, and a multistage cascade rectifier which is paraxial with the accelerator tube and has a voltage gradient which substantially matches that of the accelerator tube. More particularly, the rectifier is a multistage symmetrical cascade rectifier, the stages of which are coaxial with and surround the accelerator tube. For the preferred embodiment, the cascade rectifier has equipotential conductor plates on each side of each stage, the potential gradients between each pair of the plates being substantially uniform, and being substantially equal to the voltage gradient in the adjacent section of the accelerator tube.

A device of this type would normally generate fast neutrons (i.e., neutrons in an energy range between 10 KEV and 20 MeV). However, many applications utilize thermal neutrons (i.e., neutrons in an energy range of 0.01 to 0.3 eV) because of the larger difference in their absorption for different materials. Thus, it is frequently necessary to apply the fast neutrons generated from the target through a moderator to obtain the desired thermal neutrons. For a preferred embodiment of the invention, the elements of the neutron generator, except for the ion source, are contained within a pressurized vessel, with the moderator also being contained within such vessel adjacent the target. For one embodiment, the moderator is within a voltage terminal overlying the target.

The neutron sources described above may be utilized for various types of nondestructive testing. In one embodiment, the neutrons are applied to an object of a dense material which is to be inspected for defects, and a means is provided which is responsive to neutrons passing through the material for generating an image of the object. The neutron source may also be utilized for the detection of drugs or of explosives containing a nitrogen component by directing the neutrons to a volume being checked for such drugs or explosives, for example to a field being checked for mines or to the inspection area through which baggage is being passed, and providing a means for detecting the characteristic constituent outputs, in particular, for explosives, the characteristic gamma rays and/or neutron scatter cross section from the nitrogen component as a result of the neutron impingement.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
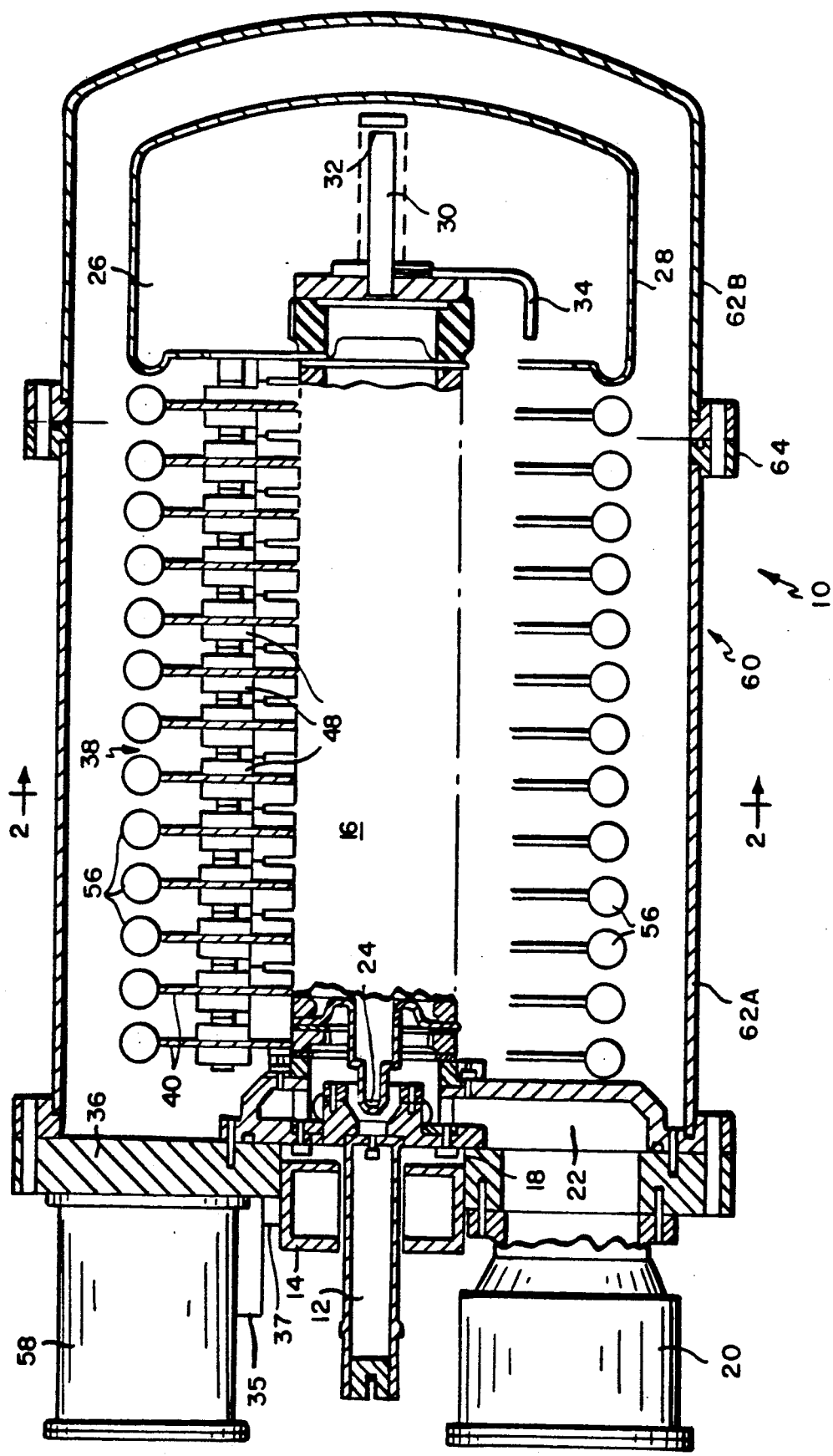
FIG. 1 is a partially cut-away sectional view of a high yield neutron generator in accordance with the teachings of this invention.

FIG. 1 shows a high energy accelerator and a neutron generator employing such accelerator, both of which operate in accordance with the teachings of this invention. The generator 10 includes an RF discharge ion source 12 of conventional construction which may, for example, be a generator producing an 80% monatomic deuteron beam having a power of approximately 2 to 4 kV at a current of up to 1 mA. A high deuteron fraction (80%) makes the ion source ideally suited for efficient production of neutrons. Such an RF ion source may be nearly maintenance free requiring only cleaning and replacement of inexpensive components at 2000 hour intervals. An example of a suitable RF ion source for this application is the Vivirad HV Corp. Model C-50-164. Further, while an RF ion source is preferred for this application, other ion sources, such as a duoplasmatron, a hollow cathode discharge ion source or a penning ion source, might also be utilized.

A magnetic coil 14 is provided around source 12 to permit the source to operate at high plasma density. Ion source 12 is bolted to the accelerator tube 16 or is otherwise suitably secured to the tube in a manner such that an air tight seal is maintained between the two elements. Accelerator tube 16 may be a standard multielectrode accelerator tube having a fixed interelectrode potential gradient. A suitable tube for this application is manufactured by Vivirad-High Voltage Engineering Corporation, Model Number D-TU-1058.

Accelerator tube 16 is maintained under vacuum by a vacuum pump 20 which is connected to the accelerator tube through a channel 22. The accelerator tube has a focus electrode 24 at its low voltage end which focuses the deuteron beam and is surrounded at its high voltage end by a moderator volume 26. The moderator volume is contained within the high voltage terminal formed by electrode 28. A channel 30 extends from the end of accelerator tube 16 and is maintained under vacuum by pump 20. The ion target 32 is positioned at the end of channel 30.

Moderator volume 26 is formed of a material which thermalizes fast neutrons passing therethrough. Moderation is accomplished as a result of the elastic scattering which occurs when elements of low atomic weight are bombarded with high energy neutrons. The moderation which occurs for a given material is known and is a function of many things including the number of collisions for a given volume and the energy transfer per collision. Materials used as moderators include water, beryllium, graphite, various plastics and paraffin. For this application, heavy water ($D_2O$) is the preferred moderator material.

The moderator volumn 26 being inside pressure vessel 60, rather than outside the vessel as for the prior art, and in particular inside the high voltage terminal, permits the moderator to be closer to the target, improving moderator performance, and permits a more compact construction for neutron source 10.

Target 32 is preferably formed of porous beryllium. The use of porous beryllium extends the target lifetime by permitting the diffusion of accumulated deuterium gas from the target.

The target may be cooled by circulating liquid freon or other insulating liquid coolants to the high voltage terminal through a tube 34. A compact pump 35 mounted to pressure vessel end flange 36 is used for this purpose. The freon gas is circulated through a heat exchanger 37 mounted to end flange 36 resulting in a heat exchange to this flange. The flange serves as a heat sink and radiator.

Figure 2:
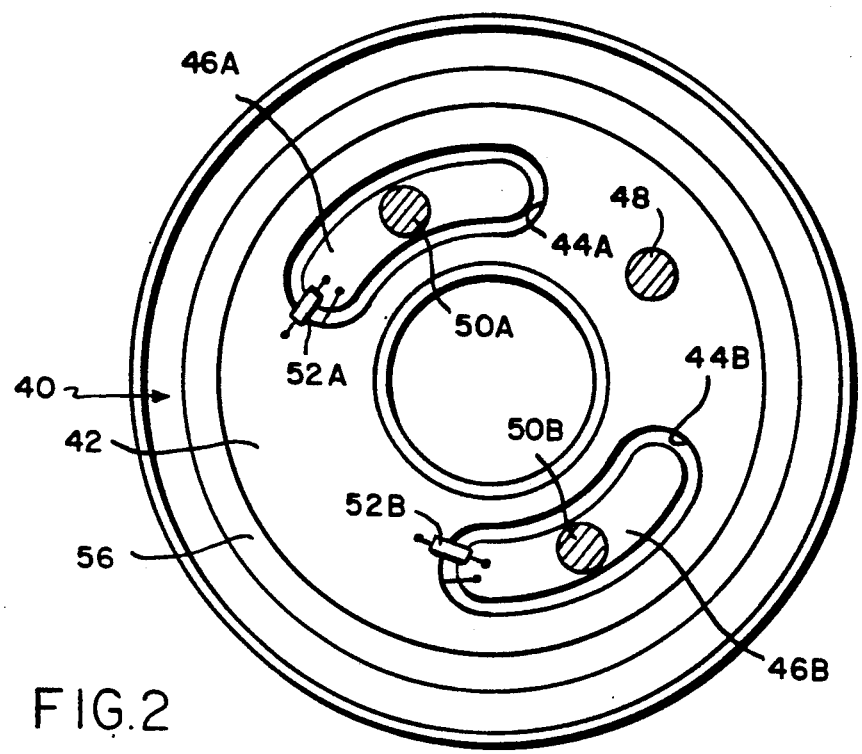
FIG. 2 is a sectional view taken along the line 2—2 in FIG. 1.

Accelerator tube 16 is surrounded by a symmetric cascade rectifier power supply or voltage multiplier 38 which is of the type shown in 07/488,749 U.S. Pat. No. 5,008,800 filed on the same date as this application in the name of Robert Klinkowstein and assigned to the same assignee. Referring both to Figs. 1 and 2, it is seen that the cascade rectifier consists of a plurality of stages, for example thirteen stages in the drawings, each of which stages has an equipotential plate 40 on either side thereof. From FIG. 2 it is seen that each plate 40 is made up of a conductive DC plate 42 having two arc shaped openings 44A and 44B formed therein. Arc shaped conductive AC plates 46A and 46B are positioned in openings 44A and 44B respectively. Between each pair of DC plates 42 defining a stage is positioned a capacitor 48, between each pair of AC plates 46A defining a stage is a capacitor 50A and between each pair of AC plates 46B defining a stage is a capacitor 50B. Solid state diodes or other rectifiers 52A and 52B are connected between AC plate 46A and the DC plate and between AC plate 46B and the DC plate respectively. Diodes (not shown) the leads of which are seen in FIG. 2, extend from each AC plate 46 to the DC plate 42 of the next lower plate 40 (i.e., the plate in the lower potential direction). A high voltage hoop 56 is connected around the outer rim of each DC plate 42. Power is applied to the cascade rectifier circuit from an AC source (not shown) through drive transformer 58 which is mounted to base flange 36 of pressure vessel 60

The voltage gradient between the plates 40 may be carefully controlled, and is controlled to provide a substantially uniform voltage gradient between the plates. This gradient is selected to be substantially equal to the voltage gradient along the corresponding section of accelerator tube 16. This matching of voltage gradients significantly enhances the operating efficiency of the system and this, in conjunction with the mounting of the accelerator tube coaxial (or at least paraxial) with the voltage multiplier, permits the desired acceleration and increase in energy for the ions from ion source 12 which pass therethrough. For a preferred embodiment, this results in an approximately 600 kV, 105 $\mu$A monatomic deuterium beam at the output from accelerator tube 16 which is applied to target 32. This results in neutrons being emitted from target 32 which, for a preferred embodiment, have a neutron flux of approximately $2 \times 10^9$ neutron/second.

The cascade rectifier power supply or multiplier 38, including a number of embodiments for such cascade rectifier, are shown and described in the beforementioned 07/488,744 U.S. Pat. No. 5,008,800 and the operation of such a cascade rectifier is also described in greater detail in this copending application. For example, as is indicated in this copending application, for some applications, the channel 61 in which the accelerator tube is positioned may be offset from the axis of the cascade rectifier (i.e., paraxial but not coaxial) providing more room on DC plate 42 for the AC plates 46 and other components. The shapes of the AC and DC plates may also vary, but should be smooth (without corners) to avoid hot spots. Discrete components may also be replaced with other types of components, and the level of the AC plate may be different from that for the corresponding DC plate, both for reasons indicated in the copending application. Finally, while a symmetric rectifier is generally preferred, an assymmetric rectifier may be utilized in some applications.

Accelerator tube 16, moderator volume 26, target 32, and cascade rectifier 38 are all enclosed within a sealed pressure vessel 60 which vessel has the base flange 36. The pressure vessel may be formed in two sections, a base section 62A and an head section 62B which are held together by screws or other suitable means (not shown) at flange 64. Construction of the pressure vessel in this way makes the pressure vessel easier to fabricate and also makes it easier to repair or replace components of the neutron source when and if necessary. High voltage terminal 28, pressure vessel head 62B, and other appropriate components may be constructed of a nuclear grade zirconium alloy (Zircaloy), or other suitable material, which has a low neutron capture and gamma emission cross section. This insures that the neutron flux from the target/moderator assembly will not be degraded and that excess gamma rays are not produced. The pressure vessel 60 is filled with a pressurized (approximately 100 psi) insulating gas such as sulphur hexafluoride. This permits compact construction by both increasing the breakdown potential between plates 40 and enabling the target/moderator assembly to be located closer to (i.e., within two inches of) grounded pressure vessel head 62B. It also increases the overall efficiency of the system.

In operation, deuterium ions from ion source 12 are focused by electrode 24 and are accelerated in accelerator tube 16 under the influence of cascade rectifier power supply/multiplier 38. The resulting high energy deuterium ions pass through channel 30 to impinge on target 32 resulting in the generation of a high intensity neutron flux which is moderated to thermal neutrons in moderator volume 26. Neutrons in the backward direction are absorbed by a panel of absorbing material (not shown) in the moderator volume with a substantial percentage of the neutrons being reflected in the forward direction to provide the desired thermal neutron flux.

The neutron flux outputted from generator 10 may be controlled by controlling the ion current from source 12. It may also be possible to control the neutron output by controlling the acceleration of the deuterons in accelerator tube 16 either by controlling the voltages in the tube, by controlling the voltage gradients of the cascade rectifier, or preferably by controlling both by equal amounts. Neutron output from the generator may be easily terminated by turning off the ion source 12. While there may be some induced radioactivity in the material inside the generator head after the ion source is turned off, this radioactivity should have a half life of only a few minutes, and therefore is not a problem.

Thus, a compact, relatively inexpensive, high neutron flux generator is provided. Since the generator operates with a relatively low beam current and power on target, the generator is reliable, relatively maintenance free, and capable of providing a mean time between failures in excess of 2000 hours. A neutron generator adapted for many applications, including portable applications, is thus provided.

Figure 3:
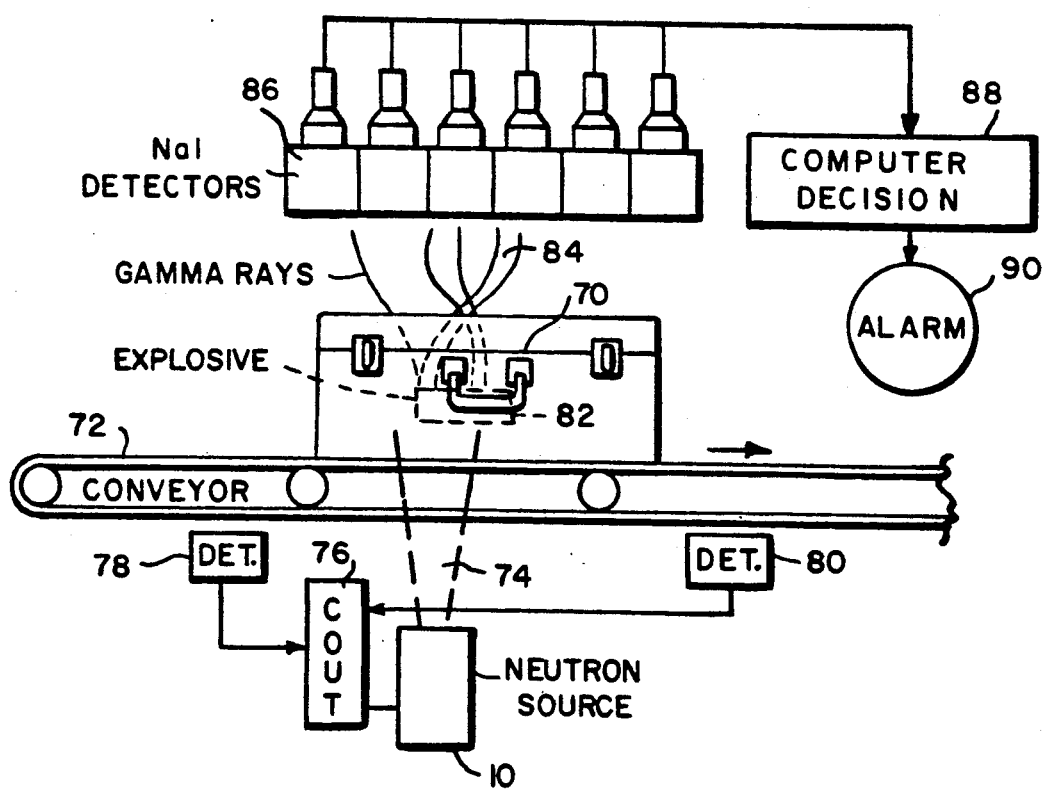
FIG. 3 is a diagram illustrating the use of the neutron generator of this invention in an drug or explosive detection system for detecting drugs or explosives in airline luggage.
Figure 4:
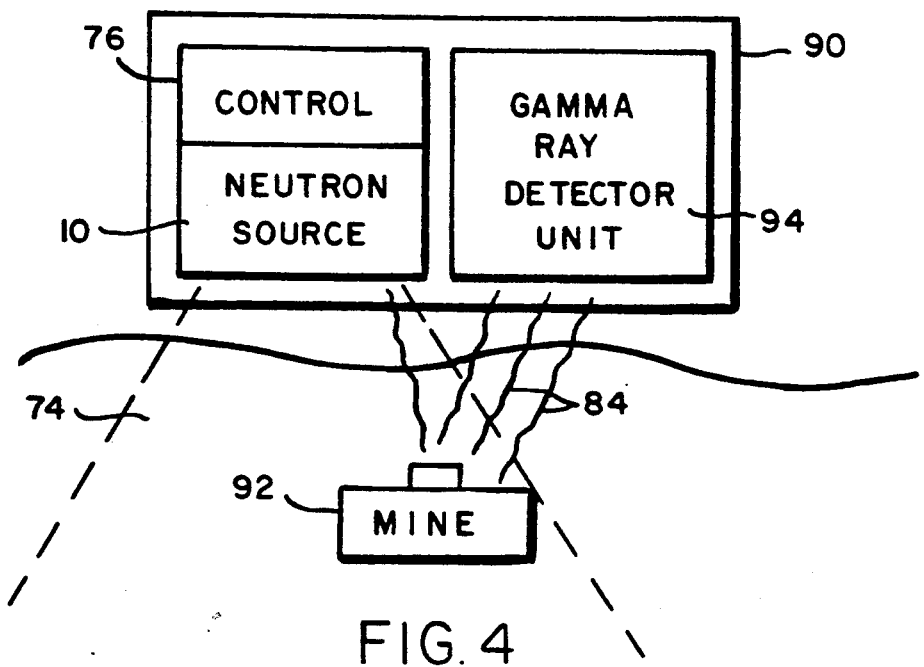
FIG. 4 is a diagram illustrating the use of the neutron generator of this invention in a mine detection system.
Figure 5:
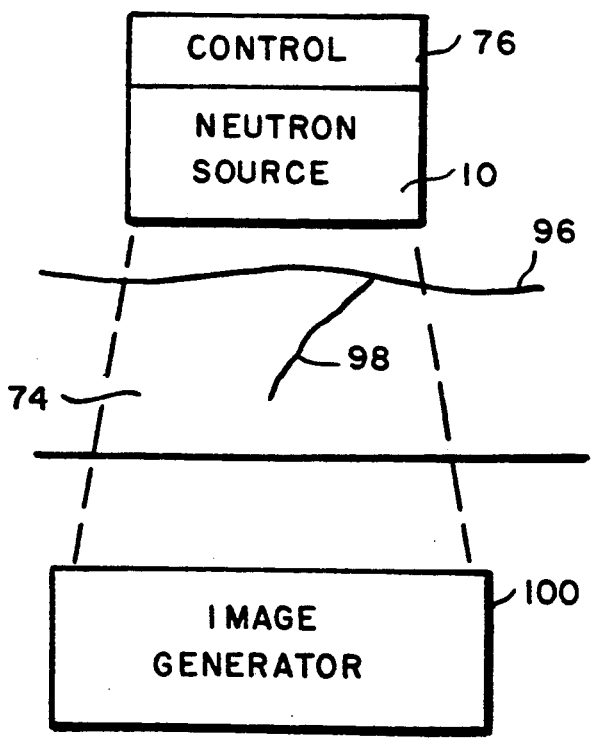
FIG. 5 is a diagram illustrating the use of the neutron generator of this invention in a nondestructive inspection system.

FIGS. 3-5 illustrate various systems utilizing the neutron generator or source 10 of this invention. Referring to FIG. 3, an explosives detection system is shown which is suitable for use, for example, for detecting explosives in luggage or other items to be loaded on an airplane, or in other words in an airport security system. In this system, the luggage 70, or other item being inspected, is moved on a conveyor belt 72 to an inspection station or location. At this location, a neutron flux 74 from a neutron source 10 of the type shown in FIG. 1 is applied to the item 70. The neutron flux may be controlled or turned on and off by a control 76. Control 76 may be manually controlled, or detectors 78 and 80, for example photodetectors, may be provided which sense when an item enters and leaves the inspection area and provide inputs to control 76 to cause it to turn the neutron source 10 on and off. Ideally, the inspection location would be in a shielded enclosure with doors through which luggage would enter and leave. In such situation, detectors 78 and 80 could detect the opening of appropriate doors.

If the neutron flux 74 impinges on an item 70 which does not contain explosives, the neutron capture reaction of a nitrogen component will not occur and there will be no high energy 10.8 MeV gamma rays outputted from the item. However, if explosives 82 are present in the item 70, gamma rays 84 having the unique energy characteristic will be outputted from the explosives 82 and will be detected by detectors 86. The outputs from detectors 86 are fed to a computer 88 which is programmed to recognize the unique gamma ray characteristic output from a nitrogen component. If computer 88 determines that a piece of luggage or other item 70 passing through the inspection station evidences such gamma ray characteristic when exposed to the neutron flux 74, it will trigger alarm 90, and may also cause the item 70 to be diverted for further inspection. A relatively simple and inexpensive detection system is thus provided which is highly reliable in detecting explosives in items being inspected and has a very low false detection rate.

The system of FIG. 3 may also be utilized to detect drugs in luggage, packages or the like. The container being inspected is irradiated with fast or thermal neutrons and detectors 86 look for characteristics of various constituents such as nitrogen, carbon, and oxygen. These constituents, and the ratio thereof, may be utilized to uniquely identify various drugs.

FIG. 4 illustrates a mine detection system 90 which may be utilized for detecting mines 92 buried to a depth in excess of 20 centimeters. The mine detector 90, which is portable, contains a neutron source 10 of the type shown in FIG. 1 which may be manually controlled by a control 76 to generate a desired neutron flux and may be turned on and off from this control. When the neutron flux impinges on a mine 92, the nitrogen component in the explosive of the mine results in a characteristic gamma ray emission 84 which is detected by gamma ray detection unit 94, which includes gamma ray detectors, suitable decision hardware and software and an indicator, either visual, audio or both, for letting the operator know that a mine has been detected.

FIG. 5 illustrates a nondestructive testing system for testing an object such as an airplane wing 96 which is fabricated of a metal or other dense material. The object of the testing is to locate a crack or other defect 98 in the object. Neutron flux 74 from neutron source 10, which source may be controlled from a suitable control 76, passes through the object 10 and is detected by a suitable neutron responsive image generator 100 which produces an image of the object 96 in which defects 98 may be seen. Image generator 100 may be one of a variety of standard pieces of equipment for performing this function, for example a neutron sensitive screen with film backing.

While the accelerator of FIG. 1 is shown as part of a neutron source, the high energy accelerator consisting of source 12, accelerator tube 16, and cascade rectifier power supply 38, may be utilized in other applications where high energy, charged particles are required. These high energy, charged particles may be utilized directly in some applications or may be utilized, as shown in FIG. 1, to impinge on a target in order to obtain high intensity radiation of a desired type. For a preferred embodiment, the source 12 is an ion source which impinges on a suitable target to generate neutrons. However, gamma rays may be obtained where source 12 is a source of protons which bombards a suitable target, such as a target of carbon 13. Such a target would produce nitrogen 14 in an excited state which, as it decays, emits gamma rays. Such gamma rays might, for example, be utilized in an explosive detection system, since they are preferentially absorbed by nitrogen. Explosives would be indicated by this enhanced absorption. Except for slight differences in components, such system would be substantially the same as that shown in FIG. 3. Similarly, such gamma rays might be utilized in a system to measure nitrogen content in the human body.

Similarly, high energy, high flux x-rays could be generated where source 12 is a source of electrons, for example, a thermionic source, which bombards a suitable target.

Further, while for the preferred embodiment, a moderator volume 26, is provided to thermalize the fast neutrons emitted from target 32, this is not a limitation on the invention and there are applications where fast neutrons might be utilized. Such neutrons are advantageous in that they have more flux, there being a substantial neutron flux loss in the moderator volume, and, because of their higher energy, they are capable of penetrating deeper. They might thus be used in nondestructive testing applications with relatively thick objects of metal or other dense material. For example, they might be used to detect drugs in large cargo containers. They might also be used for explosive detective applications, such as detecting deep mines. Such neutrons, when they strike an object having a nitrogen component, such as an explosive, would scatter with a unique scatter cross section, and it would also cause a unique gamma ray emission pattern. Explosives could be uniquely identified by detecting either the scatter cross section of the neutrons, the gamma ray emission, or preferrably both.

In addition, while for the preferred embodiment, the low voltage terminal is at the source end of accelerated tube 16, and the high voltage terminal 28 is at the target end of the accelerated tube, the polarity on these terminals could be reversed so that the high voltage terminal is at the source end of the accelerated tube and the low voltage terminal at the target end of the tube. The moderator volume may also be located outside the pressure vessel.

Further, while particular configurations and components have been described above for the neutron generator 10 of a preferred embodiment, along with various modifications thereto, it is apparent that additional modifications in such components and materials can be made while still remaining within the teachings of this invention. Similarly, while various applications for such neutron generator have been described above, it is apparent that numerous other applications exist. Thus, while the invention has been particularly shown and described above with reference to preferred embodiments, the foregoing and other changes in form and detail may be made therein by one skilled in the art without departing from the spirit and scope of the invention.

What is claimed is:

1. A neutron generator comprising:
   an ion source;
   a target adapted to generate neutrons when bombarded by high energy ions;
   an accelerator tube between said source and said target; and
   a multistage cascade rectifier, said rectifier being paraxial with and surrounding said accelerator tube and having a voltage gradient which substantially matches that of the accelerator tube.

2. A generator as claimed in claim 1 including an electrode surrounding said target; and
   moderator means through which are passed neutrons generated by said target when bombarded by accelerated ions, said moderator means being contained within said electrode.

3. A generator as claimed in claim 2, wherein the neutrons generated by the target have energy in the fast neutron range, and wherein said moderator means reduces the energy of said neutrons to thermal neutrons.

4. A generator as claimed in claim 2, wherein said electrode, moderator means, target, accelerator tube and rectifier are housed in a sealed pressure vessel.

5. A generator as claimed in claim 1, wherein said rectifier is a symmetrical multistage cascade rectifier, the stages of which are paraxial with and surround said accelerator tube.

6. A generator as claimed in claim 1, wherein said rectifier and accelerator tube are coaxial.

7. A generator as claimed in claim 1 wherein said cascade rectifier has equipotential conductor plate means on each side of each of said stages, the potential gradients between each pair of said plates being substantially uniform and being substantially equal to the voltage gradient in the adjacent section of the accelerator tube.

8. A generator as claimed in claim 7 wherein each of said metal plates has a generally circular shape with a generally circular hole being formed in each plate, the accelerator tube passing through the holes in the plates.

9. A generator as claimed in claim 1 wherein the target, accelerator tube and multiplier are housed in a sealed pressure vessel containing a pressurized insulating gas.

10. A generator as claimed in claim 9 wherein said insulating gas is sulphur hexafluoride.

11. A generator as claimed in claim 1 wherein said accelerator tube is under vacuum.

12. A generator as claimed in claim 1, wherein said neutrons are directed to an object to be nondestructively tested.

13. A generator as claimed in claim 12 wherein the object to which said neutrons are directed is an object of a dense material which is to be inspected for defects, and including means responsive to neutrons passing through said material for providing an image of said object.

14. A generator as claimed in claim 12, wherein said object is in a volume being checked for nitrogen component containing explosives, said neutrons reacting with said nitrogen component to produce characteristic radiation and including means for detecting said characteristic radiation.

15. A generator as claimed in claim 14, wherein said characteristic radiation includes characteristic gamma rays, and wherein said detecting means includes gamma ray detecting means.

16. A generator as claimed in claim 14 wherein said neutron generator and radiation detection means are part of a system for detecting explosives in various portable items; and including means for passing said items through said volume.

17. A generator as claimed in claim 14 wherein said neutron generator and radiation detection means are part of a mine detection system, mines being potentially located within said volume.

18. A generator as claimed in claim 12 wherein said object is a volume being checked for drugs, and including means for passing items to be checked for drugs through said volume, and means for detecting characteristic radiation from at least selected drugs as a result of neutron irradiation.

19. A thermal neutron generator comprising:
   an ion source;
   a target adapted to generate fast neutrons when bombarded by high energy ions;
   means for accelerating ions from said source to said target, causing high energy ions to bombard the target and fast neutrons to be emitted;
   a pressure vessel containing said target and accelerating means; and
   moderator means for thermalizing said fast neutrons, said moderator means being mounted in said pressure vessel close to said target.

20. A generator as claimed in claim 19 including a high voltage terminal substantially surrounding said target, and wherein said moderator is mounted within said terminal.

* * * * *